US012510000B2

(12) United States Patent
Liles et al.

(10) Patent No.: US 12,510,000 B2
(45) Date of Patent: Dec. 30, 2025

(54) SELF-METERING IMPINGEMENT PLATE

(71) Applicant: RTX Corporation, Farmington, CT (US)

(72) Inventors: Howard J. Liles, Farmington, CT (US); Daniel P. Preuss, Farmington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/276,714

(22) Filed: Jul. 22, 2025

(65) Prior Publication Data

US 2025/0347232 A1 Nov. 13, 2025

Related U.S. Application Data

(62) Division of application No. 18/652,263, filed on May 1, 2024, now Pat. No. 12,398,658.

(51) Int. Cl.
*F01D 25/12* (2006.01)

(52) U.S. Cl.
CPC .......... *F01D 25/12* (2013.01); *F05D 2230/20* (2013.01); *F05D 2260/201* (2013.01); *F05D 2300/6033* (2013.01)

(58) Field of Classification Search
CPC . F01D 11/24; F05D 2260/201; F05D 2240/81
See application file for complete search history.

(56) References Cited

U.S. PATENT DOCUMENTS

| | | | |
|---|---|---|---|
| 5,391,052 | A | 2/1995 | Correia et al. |
| 8,864,445 | B2 | 10/2014 | Coign et al. |
| 9,638,047 | B1 | 5/2017 | Jones |
| 10,066,549 | B2 | 9/2018 | Slavens et al. |
| 2014/0023490 | A1 | 1/2014 | Hillier |
| 2016/0319841 | A1 | 11/2016 | Mccaffrey |
| 2017/0145845 | A1 | 5/2017 | Vetters et al. |
| 2021/0189905 | A1 | 6/2021 | Metge et al. |
| 2023/0142040 | A1 | 5/2023 | Gaillard et al. |

FOREIGN PATENT DOCUMENTS

| | | | |
|---|---|---|---|
| FR | 3040735 | A1 | 3/2017 |
| FR | 3134135 | A1 | 10/2023 |
| FR | 3139292 | A1 | 3/2024 |

OTHER PUBLICATIONS

European Search Report dated Oct. 14, 2025 issued in corresponding application 25173743.3.

*Primary Examiner* — Eldon T Brockman
(74) *Attorney, Agent, or Firm* — Millen, White, Zelano & Branigan P.C.; Ryan R. Pool

(57) ABSTRACT

An impingement apparatus, containing a chamber defined by sides forming the chamber, a plurality of impingement holes located on a side of the chamber, which are able to act as a plurality of flow passages for a coolant fluid to pass from the chamber through the plurality of impingement holes to impinge of a surface to be cooled, one or more metering holes located on one or more sides of the chamber other than on the side on which the impingement holes are located, which are able to act as one or more flow passages for the coolant fluid to pass from an exterior coolant fluid source into the chamber, wherein the pressure created by the coolant fluid inside the chamber is lower than the pressure of the exterior coolant fluid source before entering the chamber through the one or more metering holes.

14 Claims, 4 Drawing Sheets

SELF-METERING IMPINGEMENT PLATE

FIELD OF THE INVENTION

The subject matter disclosed herein relates to the cooling of a component, such as a component of a gas turbine engine, many of which are made of ceramic matrix composite (CMC) materials or contains CMC materials.

BACKGROUND OF THE INVENTION

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each among other components within the turbine engine.

Some cooling schemes may employ discrete diffusion cooling holes to communicate diffused cooling flow to adjacent portions of the blades or vanes.

Some further methods for cooling turbine components use air impingement plate(s) which have a multiplicity of holes for flowing air through the impingement plate at relatively high velocity due to a pressure difference across the plate. The high velocity flow travels through the holes and impinges on the component to be cooled.

Cooling of CMC components specifically can be challenging. Impingement cooling provides effective heat transfer coefficients and controlled cooling distribution; however, this can sometimes drive large thermal gradients through the part or the pressures and coolant air velocities impacting the component may be too high, e.g., high enough to cause damage to the component. Thus, there is a desire to maintain impingement cooling but reduce its strength, for example, by controlling the impingement air velocities and supply pressures. Furthermore, there are often flow system challenges that limit the flexibility of the upstream and downstream flows and pressures. There may be leakage, pressure driven loading limitation, backflow margin constraints, attachment and/or feed geometry/fit restrictions, etc., to be considered. These conflicting objectives place constraints on the available cooling design options. Thus it is desirable to have an impingement cooling component that is uniquely able to locally modulate its effectiveness without relying on system level changes, and in a consistent and simple manner.

Among many advantages to the subject matter disclosed herein, is the achievement of providing effective cooling to CMC components in a gas turbine engine while minimizing damage to the CMC components.

SUMMARY OF THE INVENTION

An impingement apparatus according to an exemplary embodiment of this disclosure includes,

- a chamber defined by sides forming the chamber,
- a plurality of impingement holes located on a side of the chamber, which are able to act as a plurality of flow passages for a coolant fluid to pass from the chamber through the plurality of impingement holes to impinge on a surface to be cooled,
- one or more metering holes located on one or more sides of the chamber other than on the side on which the impingement holes are located, which are able to act as one or more flow passages for the coolant fluid to pass from an exterior coolant fluid source into the chamber,
- wherein the pressure created by the coolant fluid inside the chamber is lower than the pressure of the exterior coolant fluid source before entering the chamber through the one or more metering holes.

In any of the embodiments disclosed herein concerning an preponement apparatus, wherein the chamber having any number of sides and in any shape sufficient for creating a controlled pressure drop, or in a simpler form, the shape of the chamber can be, for example, rectangular having six sides, one of which sides contains the impingement holes, and one or more sides other than the side containing the impingement holes contains one or more metering holes.

In any of the embodiments disclosed herein concerning an impingement apparatus, which impingement apparatus can be made out of sheet metal.

In any of the embodiments disclosed herein concerning an impingement apparatus, wherein the apparatus can be installed into or onto a device to be cooled, wherein at least one side of the chamber is defined by the device into or onto which it is installed.

In any of the embodiments disclosed herein concerning an impingement apparatus, which impingement apparatus can have one or more metering holes entering the chamber.

In any of the embodiments disclosed herein concerning an impingement apparatus, which impingement apparatus can contain at least two chambers, wherein one of the chambers contains impingement holes on one of its sides and another chamber does not contain impingement holes, but contains at least one metering hole through which coolant fluid enters the chamber containing impingement holes.

A turbine engine according to an exemplary embodiment of this disclosure contains one or more ceramic matrix composite CMC components, wherein at least one of said CMC components have installed above a portion of the CMC component an impingement apparatus, which impingement apparatus has impingement holes, which impingement holes face the CMC component and thus allow for a coolant fluid to pass through the impingement holes to impinge on the surface of the CMC component, wherein the impingement apparatus contains:

- a chamber defined by sides forming the chamber,
- a plurality of impingement holes located on a side of the chamber, which are able to act as a plurality of flow passages for a coolant fluid to pass from the chamber through the plurality of impingement holes to impinge of a surface to be cooled,
- one or more metering holes located on one or more sides of the chamber other than on the side on which the impingement holes are located, which are able to act as one or more flow passages for the coolant fluid to pass from an exterior coolant fluid source into the chamber,
- wherein the pressure created by the coolant fluid inside the chamber is lower than the pressure of the exterior coolant fluid source before entering the chamber through the one or more metering holes.

In any of the embodiments disclosed herein concerning a turbine engine, wherein, in the impingement apparatus, the chamber having any number of sides and in any shape sufficient for creating a controlled pressure drop, one of which sides contains the impingement holes, and one or more sides other than the side containing the impingement holes contains one or more metering holes.

In any of the embodiments disclosed herein concerning a turbine engine, wherein the impingement apparatus can be made out of sheet metal.

In any of the embodiments disclosed herein concerning a turbine engine, wherein, at least one side of the chamber of the impingement apparatus can be defined by the turbine engine by the apparatus mating up against attachment architecture to form the chamber.

In any of the embodiments disclosed herein concerning a turbine engine, wherein the impingement apparatus can have one or more metering holes entering the chamber.

In any of the embodiments disclosed herein concerning a turbine engine, wherein the impingement apparatus can contain at least two chambers, wherein one of the chambers contains impingement holes on one of its sides and another chamber does not contain impingement holes, but contains at least one metering hole through which coolant fluid enters the chamber containing impingement holes.

A method according to an exemplary embodiment of this disclosure for cooling a ceramic matrix composite (CMC) component, wherein the CMC component has installed above a portion of the CMC component an impingement apparatus, which impingement apparatus has impingement holes, which impingement holes face the CMC component, wherein the method includes passing a coolant fluid through the impingement holes to impinge on the surface of the CMC component, wherein the impingement apparatus contains:

a chamber defined by sides forming the chamber, a plurality of impingement holes located on a side of the chamber, which are able to act as a plurality of flow passages for a coolant fluid to pass from the chamber through the plurality of impingement holes to impinge of a surface to be cooled, one or more metering holes located on one or more sides of the chamber other than on the side on which the impingement holes are located, which are able to act as one or more flow passages for the coolant fluid to pass from an exterior coolant fluid source into the chamber, wherein the pressure created by the coolant fluid inside the chamber is lower than the pressure of the exterior coolant fluid source before entering the chamber through the one or more metering holes.

In any of the embodiments disclosed herein concerning a method for cooling a CMC component, wherein the CMC component can be in a turbine engine.

In any of the embodiments disclosed herein concerning a method for cooling a CMC component, wherein, in the impingement apparatus, the shape of the chamber can be rectangular having six sides, one of which sides contains the impingement holes, and one or more sides other than the side containing the impingement holes contains one or more metering holes.

In any of the embodiments disclosed herein concerning a method for cooling a CMC component, wherein the impingement apparatus can be made out of sheet metal.

In any of the embodiments disclosed herein concerning a method for cooling a CMC component, wherein, in the impingement apparatus, the impingement holes can be smaller than the metering holes.

In any of the embodiments disclosed herein concerning a method for cooling a CMC component, wherein the impingement apparatus can have one or two metering holes on at least two sides of the impingement apparatus.

In any of the embodiments disclosed herein concerning a method for cooling a CMC component, wherein the impingement apparatus can contain at least two chambers, wherein one of the chambers contains impingement holes on one of its sides and another chamber does not contain impingement holes, but contains at least one metering hole through which coolant fluid enters the chamber containing impingement holes.

A method according to an exemplary embodiment of this disclosure for producing an impingement apparatus as disclosed herein, comprising forming the impingement apparatus out of sheet metal.

DETAILED DESCRIPTION OF THE INVENTION

Disclosed is a simple, yet highly effective, impingement apparatus, containing an impingement plate and one or more chambers, in which chambers the pressure drops such that the cooling fluid, e.g., air, going through the impingement holes to cool a surface minimizes damage to the surface to be cooled.

While in the simplest embodiment there is one chamber, there may be several chambers of different sizes and shapes all immediately above the impingement holes, i.e., each chamber directly feeds cooling fluid to the impingement holes.

While, again the in the simplest embodiment there is one, or perhaps several, chambers immediately above the impingement holes, i.e., chambers containing impingement holes on one of their sides, which may be separated or partitioned by internal walls, additional chamber(s) may be positioned above or besides the chamber(s) containing on one of its/their sides the impingement holes. A chamber positioned above or beside a chamber containing on one of its sides the impingement holes acts as a feed source to the chamber containing on one of its sides the impingement holes, i.e., by providing fluid flow through one or more metering holes connecting these chambers. The chambers that act as a feed source chamber do not contain impingement holes, but serve the purpose of managing pressure drops among the chambers in a stepwise manner. Thus, this type of arrangement allows for a stepwise lowering of pressures through the chambers before reaching the impingement holes.

Note that while the figures show simple shaped impingement apparatuses, their shapes as well as sizes can be adapted to the shape of any surface to be cooled by impingement. This allows for the impingement apparatus to be adaptable for basically and endless amount of applications where impingement is chosen to be used as the cooling method of a surface.

Moreover, the impingement apparatus may be prepared as a small apparatus that can fit over surfaces, such as tight spaces in a turbine engine, without impacting the overall operation of the turbine engine other than effectively cooling a surface over which it is installed.

The impingement apparatus can be constructed from sheet metal, but can be produced from other materials or approaches as long as the material is suitable to withstand the conditions to be imposed on the impingement apparatus. For example, it may be produced by additive processes, e.g., such as 3-D printing, or other casting or molding methods, from a large variety of materials, e.g., metals, composites and/or ceramics. In sum, the impingement apparatus can be produced with readily available manufacturing techniques.

The impingement apparatus in its simplest form with one chamber above the impingement holes essentially is in the shape of a box with the bottom acting as a traditional impingement plate and the remaining five sides fully enclose a volume inside to form a chamber. In reality the chamber can be any shape that creates an enclosed volume and allows for an impingement plate to be incorporated. Additionally, the apparatus can sit against attachment features, such as rails, to create sides of the control volume if beneficial.

The sides of the chamber, including the side that faces the impingement holes, as well as the sides adjacent to the impingement holes, each independently can have holes, which are termed metering holes, through which to control the flow and pressure drop entering the box's chamber, thereby creating different flow and pressure conditions above the impingement holes than what would be present without the chamber above them.

This enables one to locally drop the pressure upstream of the impingement plate to the desired level without impacting the surrounding system, e.g., the conditions above any surface in a turbine engine.

Noted is that, in one embodiment, the remaining five sides forming the chamber with the one side of the chamber containing the impingement holes is not limited to a box, as precisely defined edges are not mandatory. The entire impingement apparatus may be in the shape of a 3-D disc or ellipse or any shape having a height, the impingement apparatus containing a defined chamber formed from the sides of the apparatus, and at a portion of the chamber are impingement holes and at another portion at a distance from the impingement holes at least one metering hole is present through which coolant fluid, such as air, can enter the chamber and exit through the impingement holes.

The sizes, shapes and locations of the metering holes are predetermined to achieve the desired level of pressure and flow conditions in the chamber that the metering hole(s) feed. There is no limitation on the number and sizes of the metering holes, and it can be one hole on any single side of the chamber or several holes, e.g., two, three, four, five, six, seven, ten, fifteen, etc., on any single side of the chamber or can be on several sides of the chamber, each side independently having as many metering holes as desired.

The shape of the metering holes is typically round, e.g., one that can be easily produced by a drill bit. But other shapes are also possible, e.g., square, rectangular, hexagonal, pentagonal, star shaped, etc., which can be created by a variety of methods, including a variety of machining techniques, including hole punching through methods. Hole punching uses hardened tools with sharp edges and an applied force to shear out the unwanted material.

The impingement apparatus disclosed herein enables finite local control of pressure and flows feeding to an impingement plate's impingement holes. This is especially helpful when interfacing with CMC components that have atypical cooling and thermal gradient constraints when compared with traditional metal hardware.

There are numerous advantages to using the impingement apparatus disclosed herein. For example, it allows for a cooling circuit to incorporate an effective $2^{nd}$ supply pressure within the system instead of just an overall pressure, i.e., by setting the pressure inside the chamber lower than the overall system pressure, and maintaining backflow margin levels, while reducing pressures, flows, and leakages in circuits connected to the same source.

Moreover, the thermal gradient control expands the design space for local wall sizing, e.g., because impingement cooling can be reduced or increased locally, the wall thicknesses and CMC machined pocket sizes can be driven by more global structural and manufacturing concerns instead of a high consideration having to be given for cooling needs.

Certain embodiments can include the impingement apparatus spanning multiple BOAS to control the pressure adjacent to the mate-face gap, reducing leakage and increasing performance. For example, the impingement apparatus can be placed at various locations where leakages from higher pressure and temperature areas would be expectable toward lower pressure and temperature areas, e.g., to create a counter force and/or blockage for such expectable leakages.

BRIEF DESCRIPTION OF FIGURES

Implementations of the inventive concepts disclosed herein may be better understood when consideration is given to the following detailed description thereof. Such descriptions make reference to the included drawings, which are not necessarily to scale, and which some features may be exaggerated and some features may be omitted or may be represented schematically in the interest of clarity. Like reference numerals in the drawings may represent and refer to the same or similar element, feature, or function.

LEGEND FOR FIGURES

Figure 1:
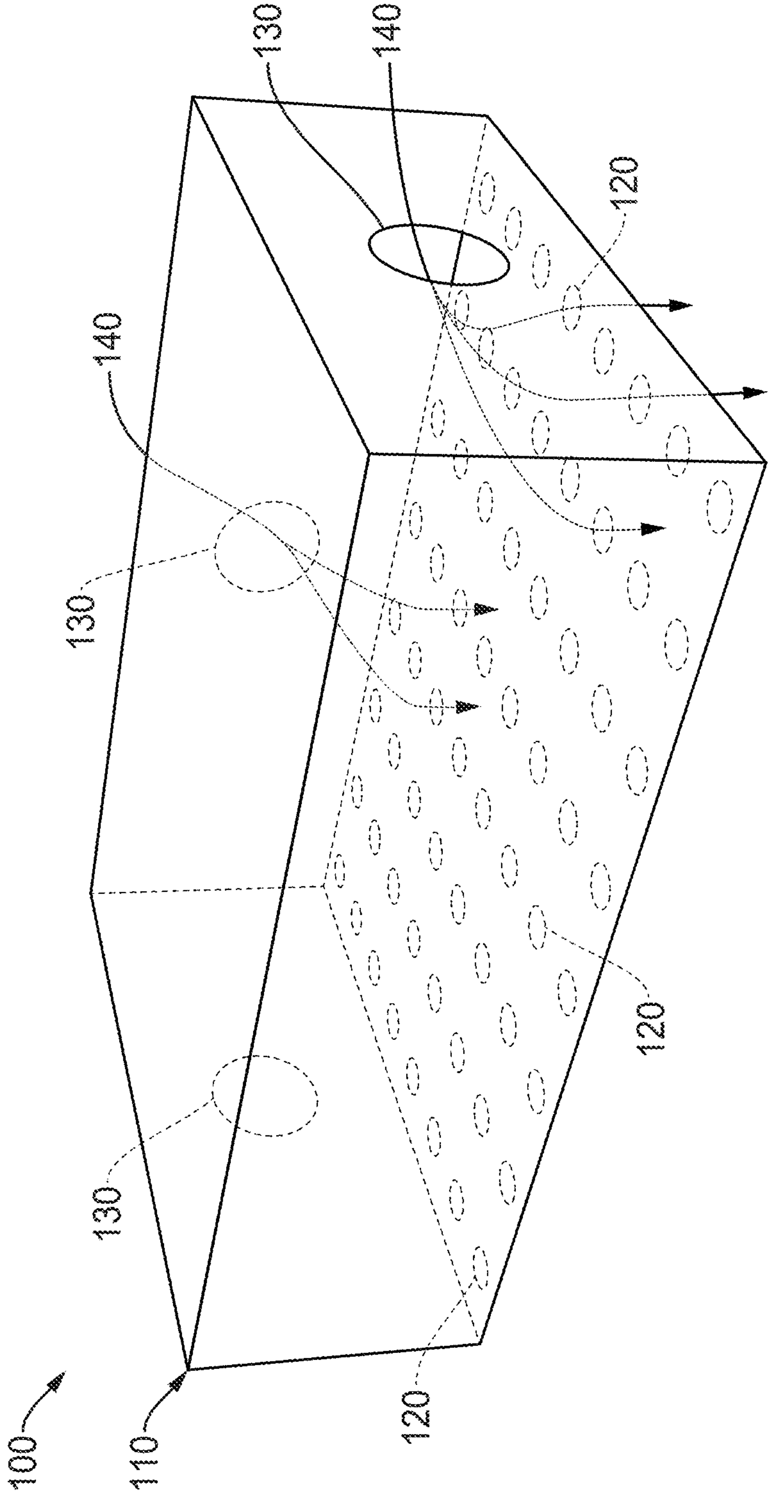
FIG. 1 illustrates a simple embodiment of the impingement apparatus having one chamber above the impingement holes with several metering holes at some of the sides of the impingement apparatus.
Figure 2:
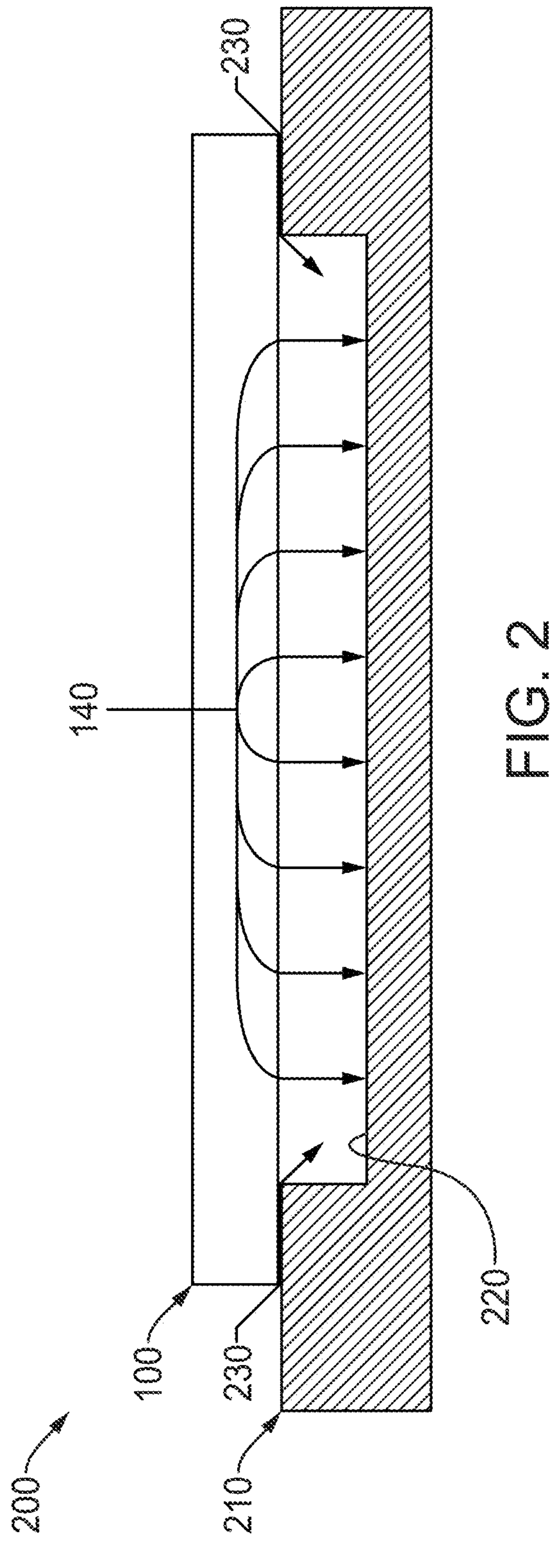
FIG. 2 illustrates the concept of the impingement apparatus being installed on a platform with a surface to be cooled by impingement cooling.
Figure 3:
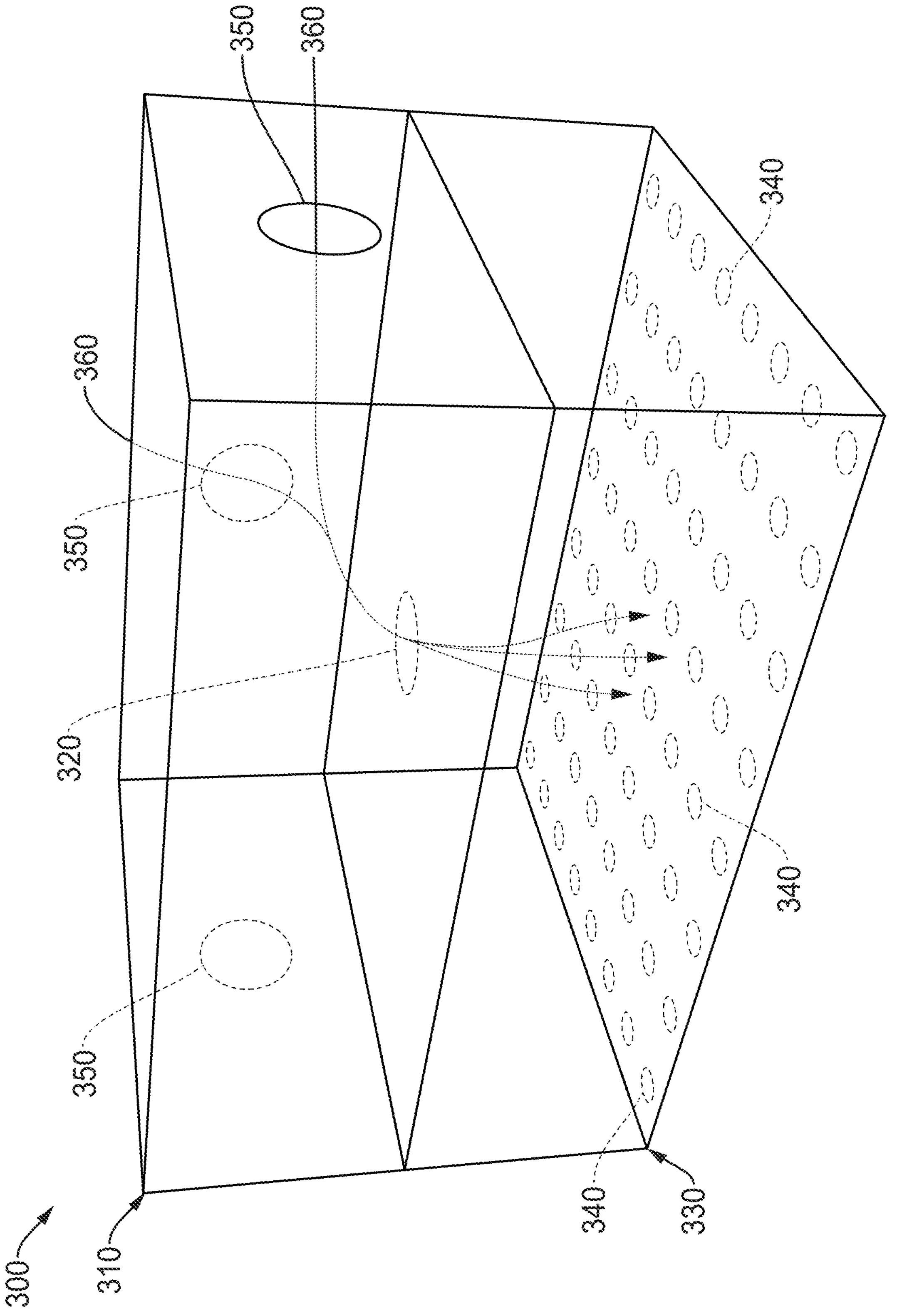
FIG. 3 illustrates a simple embodiment of the impingement apparatus having two chambers above the impingement holes with several metering holes at some of the sides of the impingement apparatus, and one impingement hole on its top that communicates with the chamber above.
Figure 4:
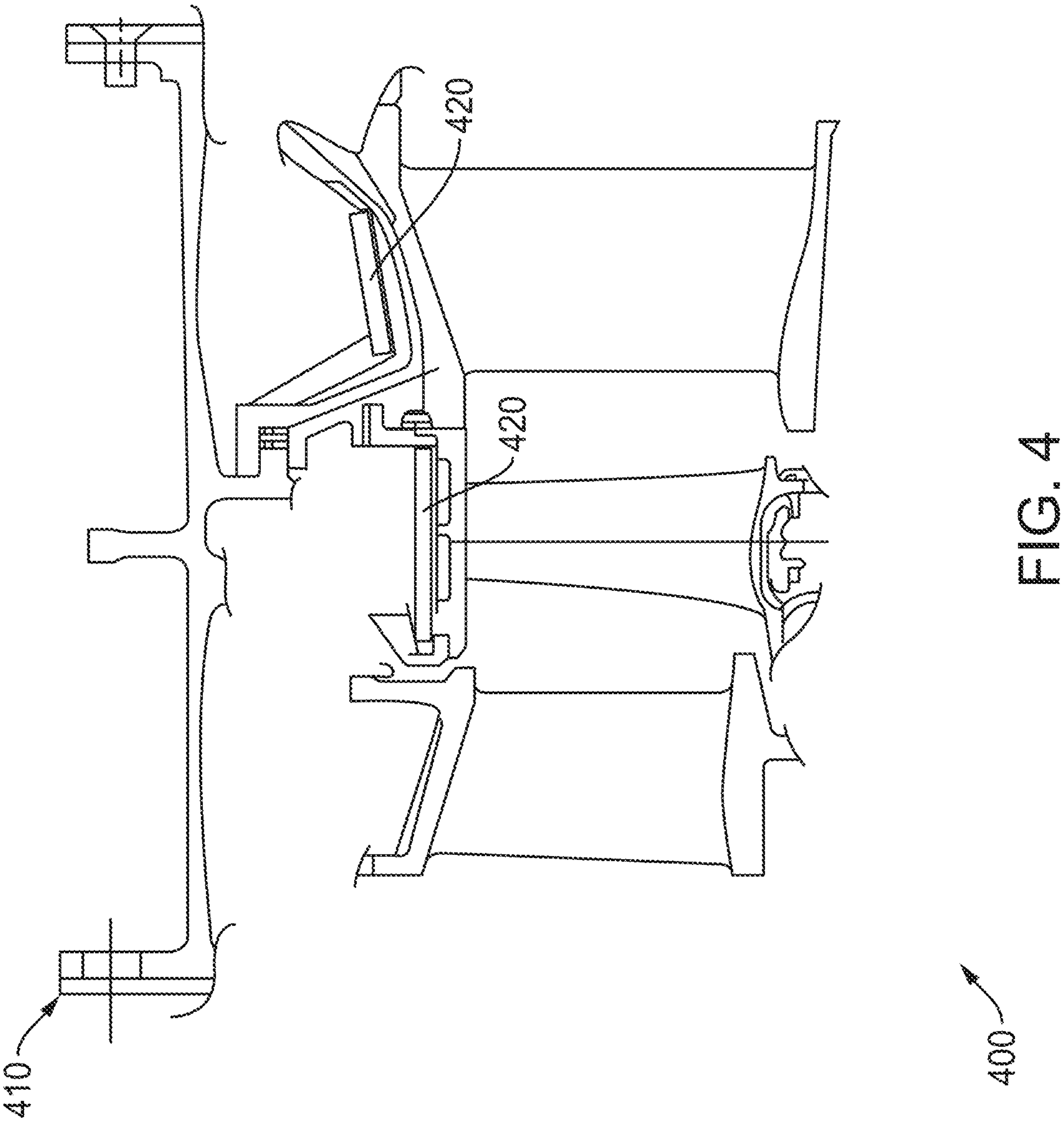
FIG. 4 illustrates a representative application/installation of the impingement apparatus in a turbine engine.

FIG. 1:
- 100—impingement apparatus
- 110—chamber
- 120—impingement holes
- 130—metering holes
- 140—fluid flow, e.g., air, into the chamber from a feed source and out of the chamber through the impingement holes FIG. 2:
- 200—installed impingement apparatus onto a platform with a surface to be cooled
- 210—platform with surface to be cooled by impingement
- 220—surface to be cooled by impingement
- 230—leakage of fluid by sides of installed impingement apparatus
- 100—impingement apparatus
- 140—fluid flow, e.g., air, into the chamber from a feed source and out of the chamber through the impingement holes FIG. 3:
- 300—impingement apparatus
- 310—second chamber above first chamber
- 320—metering hole between the first and second chambers
- 330—first chamber
- 340—impingement holes
- 350—metering holes on side of the second chamber
- 360—fluid flow, e.g., air, into the second chamber from a feed source, then to the first chamber and out of the first chamber through the impingement holes FIG. 4:
- 400—installed impingement apparatuses in a turbine

410—turbine engine

420—impingement apparatus

FIG. 1 shows an embodiment of the impingement apparatus (100), which in this simple form, is a box containing a chamber (110). It is however to be appreciated that the shape of the apparatus is not limited to a box shape, but can take on a variety of shapes, e.g., cylindrical, hexagonal, or any irregular shape adapted to cool a surface having an irregular shape. Likewise, the side of the box containing the impingement holes (120) does not have to be flat, but can have a curvature or several curvatures that are adapted to impinge on a surface not having a flat topography, i.e., the topography of the side of the box containing the impingement holes (120) can be adapted to follow the topography of a surface to be cooled by impingement.

One side of the box contains impingement holes (120) and at least one other side of the box contains one or more metering holes (130). In this embodiment of FIG. 1, three sides each contain a metering hole (130), and the other two sides (one side adjacent to the side containing the impingement holes and one side facing the side containing the impingement holes) do not contain metering holes.

The number, size and location of the metering holes (130) are adaptable for achieving desired pressure and flow conditions inside and through the chamber (110). One can appreciate that several holes on a single side of an impingement apparatus, e.g., having directly oncoming fluid flow would create different pressure and flow conditions inside the chamber than a single hole at a side that has the fluid flow passing by in a parallel or nearly parallel flow direction to the metering hole.

The number, size and exact location of the impingement holes (120) are also adaptable, and primarily for achieving desired pressures and flow conditions through these impingement holes and impinging on a surface to be cooled. However, one can easily appreciate that these impingement holes too will affect pressure and flow conditions inside the chamber, e.g., by creating backpressure. The arrangement of the impingement holes (120) can easily be adapted to impinge a surface of any shape. While the impingement apparatus (100) may over a larger area of a surface to be cooled, the impingement holes can be present on only a portion of the side of the box containing impingement holes (120) that are arranged to impinge only a selected portion of the surface to be cooled. Variation of the sizes, shapes and densities of the impingement holes within a single impingement apparatus are also possible. For example, one may arrange larger impingement holes (120) on certain portions of the side of the box containing impingement holes (120) while smaller holes on other portions of the side of the box containing impingement holes (120). Likewise, one may arrange impingement holes (120) at a higher density on certain portions of the side of the box containing impingement holes (120) while a lower density of holes on other portions of the side of the box containing impingement holes (120). Any combination of arrangement of densities, shapes, sizes and number of impingement holes (120) is within the scope of this disclosure.

The size, including volume, and shape of the chamber is not limited, but one can appreciate that this too factors into the conditions that will be created inside the impingement apparatus' chamber when in use.

The impingement apparatus can have any shape and size, as its shape as well as its size can be adjusted to fit into various devices to be cooled. The shape of the impingement apparatus is not limited to rectangular shapes, for example, as provided in the figures herein. For example, the impingement apparatus may have many sides, e.g., 4, 5, 6, 7, 8, 9, 10, 12, 15, 16 or even 20 or more. Moreover the sides are not limited to be defined by abrupt transitions, e.g., angular change from one side's surface to another, as the transition can be a smooth transition, e.g., defined by an arc or curvature.

Moreover, in one embodiment, the impingement apparatus may have one or more sides of a chamber missing before installation into or onto a device, e.g., turbine engine, to be cooled. The impingement apparatus when installed however in this type of embodiment will have a chamber formed once installed, as the device to be cooled will complete the missing walls of the chamber. For example, the impingement apparatus when installed mates up against attachment architecture present or provided in the device to be cooled to form the chamber rather than having to be a self-contained chamber on all sides before installation.

With the selection of, e.g., the size and shape of the impingement apparatus, as well as, e.g., the sizes, shapes and amounts of impingement holes and metering holes, one can create a desired or predetermined fluid flow (140), e.g., air, into the chamber from a feed source and out of the chamber through the impingement holes to achieve a predetermined amount of impingement cooling on a surface with predetermined pressure and flow conditions, including pressure and flow conditions that minimize damage to CMC materials in a turbine engine.

The size of impingement holes is generally 0.010" to 0.1, e.g., 0.02", 0.03" 0.04", 0.05", 0.06", 0.07", 0.08" or 0.09", or can be in a range between any of these number.

The size of metering holes is generally 0.010" to 0.1", e.g., 0.05" to 0.5", 0.1 to 0.3, 0.2 to 0.25", or can be in a range between any of these number.

While the impingement holes are generally smaller than the metering holes, it is not a requirement. The pressure drop of the metering holes and required heat transfer coefficient of the impingement holes will drive sizing. In one aspect, the impingement holes may be the same size or greater in size than the metering holes, using the chamber to make the pressure drop upstream and distribute the flow more favorably downstream if the additional heat transfer isn't required.

In one embodiment, disclosed herein concerning an impingement apparatus, the impingement and metering hole sizes can be controlled independently to accommodate pressure and heat transfer requirements. Generally, in one embodiment, the size of the impingement holes can be however smaller than the size of the metering holes.

The wall thickness of the impingement apparatus can also vary significantly, and is highly dependent on the conditions to which the impingement apparatus will be subject to, as well as the material that is used to form the impingement apparatus. Thicknesses of the walls of the apparatus can potentially vary significantly depending on the material used. In an embodiment that uses sheet metal, thickness will be generally about 0.012 inches, which is a standard stock size, though it can be different from stock size, for example, higher, for a given application in stock increments. The sheet metal upper bound may be constrained by what shape is being targeted and how malleable the material is to achieve said shape.

In one embodiment, an impingement apparatus is made or constructed from sheet metal of sufficient rigidity to withstand conditions in a turbine engine.

FIG. 2 shows an embodiment of the impingement apparatus (100), in a cross sectional view, which is installed on a platform (210) that has a surface (220) to be cooled. The platform can be a part of a turbine engine and/or a part made of a CMC material. In this embodiment there is only one metering hole on the side of the impingement apparatus that faces the side with the impingement holes. The coolant fluid enters the chamber of the impingement apparatus and exits through the impingement holes thereby creating the fluid flow (140), e.g., air, into the chamber from a feed source and out of the chamber through the impingement holes. Noted is that under the conditions in the turbine where pressures and temperatures and overall conditions are harsh on any materials, it is a possibility to have some leakage (230) of coolant fluid by sides of installed impingement apparatus, which should be ideally minimized. Noted is that the placement of the impingement apparatus can be chosen such that it blocks leakage of high pressure high temperature fluids, e.g., air, from pushing into areas of a turbine having lower pressures and lower temperatures, thereby achieving an additional benefit other than the cooling of a surface.

FIG. 3 shows an embodiment of the impingement apparatus (300) that is similar to the one depicted in FIG. 1, but which contains two chambers above the impingement holes, which allows for a stepwise control of pressure drops through the chambers. A second chamber (310) is provided on top of the first chamber (330), which chambers are in communication with each other through a metering hole (320) between these chambers. The number of metering holes between the two chambers may be more than one, e.g., two, three, four, five, ten. The second chamber has metering holes (350) on its sides, which provide fluid flow (360) into the second chamber, from which the fluid enters the first chamber (330), from which first chamber the fluid exits the apparatus through the impingement holes (340) and provides impingement cooling to a surface above which the apparatus (300) is installed. There is no limitation on the number or sizes of the metering holes on the sides of the second chamber, and it may be, for example, one, two, three, four, five, or ten metering holes.

FIG. 4 illustrates two impingement apparatuses (420) installed (400) in a turbine engine (410). This is merely a representative use of the impingement apparatus as it is to be understood that any part of a turbine engine or other type or device, e.g., one made from CMC materials, may be cooled by impingement by the use of the impingement apparatus disclosed herein.

As will be appreciated by one skilled in the art, the embodiments described herein may be embodied as a method of use or preparation, a product, including a part for use in various assemblies, or use per se.

The description of the embodiments described herein has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

Modifications and equivalents may be made to the features disclosed without departing from the spirit or scope of the invention. Thus, it is intended that the embodiments described herein covers the modifications and variations disclosed above, including changes that lead to equivalents, i.e., modifications and equivalents may be made to the features of the claims without departing from the scope of the invention.

What is claimed is:

1. A turbine engine that contains one or more ceramic matrix composite (CMC) components, wherein at least one of said CMC components have installed above a portion of the CMC component an impingement apparatus, which impingement apparatus has impingement holes, which impingement holes face the CMC component and thus allow for a coolant fluid to pass through the impingement holes to impinge on the surface of the CMC component, wherein the impingement apparatus comprises:

a chamber defined by sides forming the chamber, a plurality of impingement holes located on only one side of the chamber, which are able to act as a plurality of flow passages for a coolant fluid to pass from the chamber through the plurality of impingement holes to impinge of a surface to be cooled, one or more metering holes located on at least two sides of the chamber and not located on the side on which the impingement holes are located, said one or more metering holes are positioned upstream from said plurality of impingement holes and are able to act as one or more flow passages for the coolant fluid to pass from an exterior coolant fluid source into the chamber, wherein the pressure created by the coolant fluid inside the chamber is lower than the pressure of the exterior coolant fluid source before entering the chamber through the one or more metering holes.

2. The turbine engine according to claim 1, wherein, in the impingement apparatus, the shape of the chamber is rectangular having six sides, one of which sides contains the impingement holes, and one or more sides other than the side containing the impingement holes contains one or more metering holes.

3. The turbine engine according to claim 1, wherein the impingement apparatus is made out of sheet metal.

4. The turbine engine according to claim 1, wherein, at least one side of the chamber of the impingement apparatus is defined by the turbine engine by the apparatus mating up against attachment architecture to form the chamber.

5. The turbine engine according to claim 1, wherein the impingement apparatus has one or two metering holes on at least two sides of the impingement apparatus.

6. The turbine engine according to claim 1, wherein the impingement apparatus contains at least two chambers, wherein one of the chambers contains impingement holes on one of its sides and another chamber does not contain impingement holes, but contains at least one metering hole through which coolant fluid enters the chamber containing impingement holes.

7. A method for cooling a ceramic matrix composite (CMC) component, wherein the CMC component has installed above a portion of the CMC component an impingement apparatus, which impingement apparatus has impingement holes, which impingement holes face the CMC component, wherein the method comprises passing a coolant fluid through the impingement holes to impinge on the surface of the CMC component, wherein the impingement apparatus comprises:

a chamber defined by sides forming the chamber, a plurality of impingement holes located on only one side of the chamber, which are able to act as a plurality of flow passages for a coolant fluid to pass from the chamber through the plurality of impingement holes to impinge of a surface to be cooled, one or more metering holes located on at least two sides of the chamber and not located on the side on which the impingement holes are located, said one or more metering holes are positioned upstream from said plurality of impingement holes and are able to act as one or more flow passages for the coolant fluid to pass from an exterior coolant fluid source into the chamber, wherein the pressure created by the coolant fluid inside the chamber is lower than the pressure of the exterior coolant fluid source before entering the chamber through the one or more metering holes.

8. The method according to claim 7, wherein the CMC component is in a turbine engine.

9. The method according to claim 7, wherein, in the impingement apparatus, the shape of the chamber is rectangular having six sides, one of which sides contains the impingement holes, and one or more sides other than the side containing the impingement holes contains one or more metering holes.

10. The method according to claim 7, wherein the impingement apparatus is made out of sheet metal.

11. The method according to claim 7, wherein, in the impingement apparatus, the impingement holes are smaller than the metering holes.

12. The method according to claim 7, wherein the impingement apparatus has one or two metering holes on at least two sides of the impingement apparatus.

13. The method according to claim 7, wherein the impingement apparatus contains at least two chambers, wherein one of the chambers contains impingement holes on one of its sides and another chamber does not contain impingement holes, but contains at least one metering hole through which coolant fluid enters the chamber containing impingement holes.

14. A method for producing an impingement apparatus according to claim 7, comprising forming the impingement apparatus out of sheet metal.

* * * * *